W. J. WALTERS & W. BOYD.
VEHICLE TIRE.
APPLICATION FILED DEC. 22, 1911.

1,120,348.

Patented Dec. 8, 1914

Witnesses

William J. Walters,
William Boyd, Inventors
by C. A. Snow & Co.
Attorneys

UNITED STATES PATENT OFFICE.

WILLIAM J. WALTERS, OF DETROIT, AND WILLIAM BOYD, OF GRAND RAPIDS, MICHIGAN.

VEHICLE-TIRE.

1,120,348.  Specification of Letters Patent.  Patented Dec. 8, 1914.

Application filed December 22, 1911. Serial No. 667,354.

*To all whom it may concern:*

Be it known that we, WILLIAM J. WALTERS and WILLIAM BOYD, citizens of the United States, residing, respectively, at Detroit and Grand Rapids, in the counties of Wayne and Kent, State of Michigan, have invented a new and useful Vehicle-Tire, of which the following is a specification.

The primary object of this invention is to provide an improved vehicle tire which cannot be punctured, the device consisting of inner and outer tubular members, of novel and improved form, interengaged with each other in a novel manner, and interengaged likewise with a tread of novel form.

A further object of the invention is to provide a novel form of tread, adapted to be assembled with inner and outer tubular members, and to provide novel means for assembling these tubular members with the rim.

A further object of the invention is to provide a tire consisting of inner and outer tubular members, and a tread, one of which tubular members holds the tread against movement circumferentially of the wheel, the other of which tubular members retain the tread against movement radially of the wheel.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
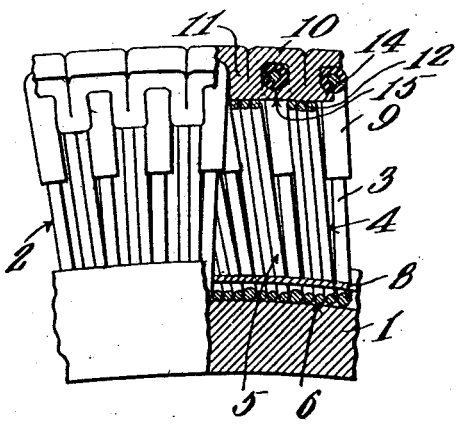
Figure 2:
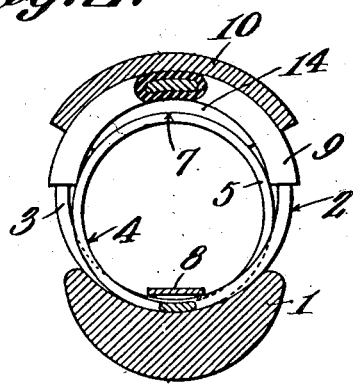
Figure 3:
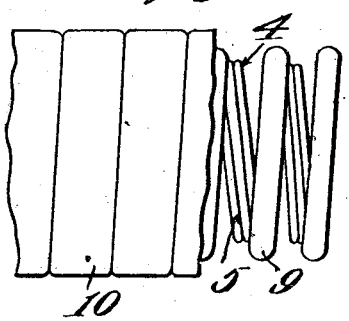

In the accompanying drawings,—Figure 1 is a sectional side elevation of a portion of a tire constructed in accordance with the present invention; Fig. 2 is a transverse section of the structure shown in Fig. 1; Fig. 3 is a top plan of the structure shown in Fig. 1, parts being broken away.

In the accompanying drawings, a rim 1 is shown, the same being preferably concaved at its periphery. The invention further includes a resilient, tubular, outer member 2, including a plurality of annular elements 3. The resilient outer member 2 preferably is in the form of a helical spring. The invention further includes a resilient, tubular, inner member 4, located within the outer member 2, and consisting of a plurality of annular elements 5. The inner member 4, like the outer member 2, is preferably a helical spring. The convolutions of the springs 2 and 4 rest upon the rim 1, the convolutions 5 of the inner member 4 filling the spaces between the convolutions 3 of the outer member 2, circumferentially of the rim 1, so that the convolutions 3 and 5 are in continuous contact, circumferentially of the rim 1, as indicated at 6. Adjacent the tread of the device, however, the convolutions 5 of the inner member 4 are spaced from the convolutions 3 of the member 2, radially of the structure, as indicated at 7.

The resilient tubular members 2 and 4 are held upon the rim 1 by means of a retaining ring 8 which extends circumferentially of the rim 1, within the members 2 and 4, as will be readily understood from an examination of Figs. 1 and 2. The convolutions 3 of the resilient tubular member 2 are inclosed by tubular coverings 9, which may be of any length, these coverings 9 being fashioned from rubber, leather, canvas or the like.

The tread is denoted generally by the numeral 10, and preferably takes the form of a strip of oil-tanned leather, raw hide, rubber, canvas, or other suitable material. The tread 10 is formed into a plurality of loops 11, transversely of the rim 1. These loops 11 are inserted between the convolutions 3 of the resilient, outer spring 2, and adjacent convolutions 3 press the loops 11 tightly together. As shown at 12, the loops 11 are supported by the convolutions 5 of the resilient inner member 4, the convolutions 5 alternating with the convolutions 3 of the outer member 2. The loops 11, within the contour of the outer tubular member 2, are carried laterally, in opposite directions, circumferentially of the device, to form extensions 14, the extension 14 of one loop 11 coming into contact with the extension 14 of the next adjacent loop 11, beneath the convolution 3, as indicated at 15.

It is to be noted that the convolutions 3 of the outer member 2 hold the tread 10 against movement circumferentially of the wheel, the convolutions 5 of the inner member 4 retaining the tread against movement radially of the wheel.

Having thus described the invention, what is claimed is:—

1. In a tire, a resilient structure comprising spaced, curved parts; and a tread in the form of a strip, the strip being flexed upon itself to form continuous, radially projecting loops, the loops being wider than the spaces between the curved parts when the tread and the resilient structure are separated, the loops being located between adjacent curved parts and the walls of the loops being closely pinched together by the action of adjacent curved parts.

2. In a tire, a helical spring; and a tread strip folded upon itself to form continuous, radially projecting loops, the loops being wider than the spaces between the convolutions of the spring when the spring and the tread strip are separated, the loops being located between adjacent convolutions of the spring, and the walls of the loops being closely pinched together by the action of adjacent convolutions of the spring.

In testimony that we claim the foregoing as our own, we have hereto affixed our signatures in the presence of two witnesses.

WILLIAM J. WALTERS.
WILLIAM BOYD.

Witnesses:
JOHN A. WILLIAMS,
B. F. ORSER.